(12) United States Patent
Veith et al.

(10) Patent No.: US 6,713,746 B2
(45) Date of Patent: Mar. 30, 2004

(54) ARRANGEMENT AND METHOD FOR ILLUMINATING A SPECIMEN FIELD IN AN OPTICAL INSTRUMENT

(75) Inventors: Michael Veith, Wetzlar (DE); Uwe Graf, Solms (DE); Joachim Wienecke, Jena (DE)

(73) Assignee: Leica Microsystems Jena GmbH, Jena (DE)

( * ) Notice: Subject to any disclaimer, the term of this patent is extended or adjusted under 35 U.S.C. 154(b) by 0 days.

(21) Appl. No.: 10/193,126

(22) Filed: Jul. 12, 2002

(65) Prior Publication Data

US 2003/0015643 A1 Jan. 23, 2003

(30) Foreign Application Priority Data

Jul. 12, 2001 (DE) .......................................... 101 33 992

(51) Int. Cl.[7] .................................................. G01J 1/32
(52) U.S. Cl. .................................. 250/205; 250/559.22
(58) Field of Search ................................ 250/205, 221, 250/559.4, 201.3, 306, 307, 559.22; 356/399–407

(56) References Cited

U.S. PATENT DOCUMENTS 4,163,150 A     7/1979  Stankewitz
5,153,419 A  * 10/1992  Takahashi ................ 250/201.1
5,700,084 A  * 12/1997  Yasukawa et al. .......... 362/275
5,761,336 A     6/1998  Xu et al.
5,925,887 A     7/1999  Sakai et al.

* cited by examiner

Primary Examiner—Que T. Le
(74) Attorney, Agent, or Firm—Foley & Lardner

(57) ABSTRACT

An arrangement for illuminating a specimen field in an optical instrument for specimen viewing includes: an illumination device, arranged in a housing, including a light source and an illuminating optical system, where a position of the light source or illuminating optical system is adjustable within the illumination device; a setting device including at least one drive system and configured to positionally adjust the light source or illuminating optical system; at least one linkage member connected to the light source or illuminating optical system, where the linkage member includes a coupling member accessible by the setting device from outside the housing; at least one measurement device configured to sense parameters of the light generated by the illumination device; and a control device that is configured to generate positioning commands for positional adjustment of the light source or illuminating optical system by the drive system as a function of the sensed parameters.

24 Claims, 11 Drawing Sheets

ARRANGEMENT AND METHOD FOR ILLUMINATING A SPECIMEN FIELD IN AN OPTICAL INSTRUMENT

CROSS REFERENCE TO RELATED APPLICATIONS

This application claims priority of the German patent application 101 33 992.5 which is incorporated by reference herein.

FIELD OF THE INVENTION

The invention refers to an arrangement for illuminating a specimen field in an optical instrument that serves for specimen viewing, as well as a corresponding method.

BACKGROUND OF THE INVENTION

Uniform and reproducible illumination of a specimen that is to be examined is very important for the functionality of complex optical instruments, for example measurement and inspection systems for the examination of semiconductor wafers. Even slight changes in an illumination device used for this purpose can considerably degrade the performance of the optical instrument.

In particular when high-intensity light sources are used in combination with extremely high-magnification objectives, conventional illumination devices in many cases can no longer meet present-day requirements for high resolution. This applies in particular to demanding inspection and measurement tasks in the UV (ultraviolet) and DUV (deep ultraviolet) regions. The reasons for this are usually inadequate mechanical and thermal stability of the illumination device, and hitherto insufficient alignment capabilities. For example, the changes in illumination caused by the instabilities lower the optical resolution limit for microscopic examinations.

External influences such as vibration and shock thus result in a misalignment between the light source and the illuminating optical system of the illumination device.

As a result of high thermal loading and the effect of strong UV light, changes occur on the internal surfaces of the illumination device housing, in particular on the illuminating optical system and the light source, which negatively affect the intensity of the emitted light over time.

In illumination devices that are used in instruments under clean-room conditions, a sealed housing must be provided in order to prevent contamination of the specimens being examined. This results in the additional problem of a laborious process of replacing the light source, since the housing must be opened in order to make the replacement. In addition, the need to realign the illumination device usually also arises in conjunction with a replacement of the light source. The alignment capabilities available in conventional illumination devices are, however, insufficient in terms of achieving a high illumination quality, or at any rate are very complex with regard to manipulation. If reproducible conditions are to be ensured following a light source replacement, specially trained persons must therefore be used for the purpose.

U.S. Pat. No. 5,925,887 discloses, in conjunction with a projection exposure apparatus, the problem of monitoring the optical exposure parameters when the intention is to work at the limits of technology. In this, the pattern of a mask is aligned with respect to a substrate by means of a projection objective. A device for determining the change in the optical properties of the projection objective is also provided. These changes can result, for example, from heating of the projection objective due to intensive illumination irradiation, but they also depend (inter alia) on the mask, and cause a change in the imaging properties of the projection objective. To compensate for these changes, it is proposed in U.S. Pat. No. 5,925,887 to perform an adjustment of the lens elements of the projection objective that compensates for the deviations. No intervention in the actual illumination device is performed in this context.

It is also already known from U.S. Pat. No. 5,761,336, in order to improve defect detection on semiconductor wafers, to adjust a diaphragm on a microscope in such a way that a maximum detection probability is achieved for specific defect types. Since evaluation of the defects is performed ultimately by an operator, however, the visual effort for defect detection is very great. The risk furthermore exists that changes in the illumination parameters will not be recognized by the operator. Consistent evaluation conditions are thus very difficult to guarantee. Especially in the context of a replacement of the light source, continuity of examination parameters is almost impossible to maintain for examinations at the limit of resolution.

Lastly, U.S. Pat. No. 4,163,150 discloses an arrangement and a method intended to achieve automatic implementation of the Köhler illumination principle in a microscope. This is done by measuring an illumination intensity with a photosensor, and using the measured value to control a diaphragm and/or the focal length of a lens arrangement within the illuminating optical system. The purpose of the illumination principle proposed here is to optimize the illumination conditions, in a context of variable image magnification, in terms of achievable resolution and contrast. Changes in the alignment state of the light source are not, however, taken into consideration here.

SUMMARY OF THE INVENTION

Proceeding therefrom, it is the object of the invention to create an arrangement for illumination of a specimen field in an optical instrument that makes possible reproducible illumination of the specimen field with highly consistent illumination quality for a specific illumination task.

According to the present invention, this object is achieved with an arrangement of the kind described above which comprises: an illumination device having a light source and an illuminating optical system, the position of the light source and/or of the illuminating optical system being adjustable within the illumination device; a setting device having at least one motorized drive system for positional adjustment of the light source and/or the illuminating optical system; at least one measurement device for sensing parameters of the light generated by the illumination device; and a control device that is configured for the generation of positioning commands for positional adjustment of the light source and/or the illuminating optical system by means of the motorized drive system as a function of the sensed parameters.

By way of the automatic positional setting or alignment of the light source, and optionally also of the illuminating optical system present in the illumination device, the characteristics of the illumination of the specimen field can be adapted to different observation specimens and/or illumination tasks. It is possible to reproduce a specimen—or situation—dependent illumination with little effort in terms of manipulation. Automation of the procedure ensures rapid and easy setting of the corresponding subassemblies, with no need to employ specially trained or instructed operating personnel for the purpose. At the same time, a high illumination quality is achieved so that the best utilization conditions can be consistently achieved with the optical instrument.

In addition, replacement of the light source can also be considerably simplified, since the operator no longer needs to perform settings and alignments in this context. Instead, the entire setting operation after an exchange of the light source can proceed automatically, thereby rapidly re-establishing the performance of the optical instrument after a replacement of the light source.

The arrangement according to the present invention can moreover also be used during operation of the optical instrument, by way of a continuous or quasi-continuous monitoring function, to ensure a consistently high illumination quality. If changes in illumination that negatively affect performance occur during operation of the optical instrument, they can be very quickly corrected. By stipulating an appropriate monitoring regime it is possible, for example in the context of the inspection of semiconductor wafers, to achieve optical defect detection at a consistently high level.

Incandescent lamps, halogen lamps, discharge lamps, or laser light sources are possible, for example, as the light source for the optical instrument. The aforementioned "illuminating optical system" is understood here to be all the optical elements and subassemblies that serve to define the illuminating light. These include, in particular, reflectors, lens elements, lens arrangements, and diaphragms, as well as combinations of such components.

In an advantageous embodiment of the arrangement, a measurement device is arranged on a displaceable stage that also serves to receive and hold a specimen that is to be examined. The consistency of the parameters of the illuminating light can thus be set in direct reference to the actual examination location. This has the advantage that changes between the illumination device and the specimen field can additionally be compensated for by way of the illumination device. In an optical instrument that operates on the incident-light principle, i.e. in which the illuminating light is guided through a portion of the observing optical system of the optical instrument, changes in that optical system can also be taken into account. This also applies analogously to an illumination according to the transmitted-light principle, and correspondingly to components arranged between the illumination device and the specimen field.

A light-sensitive receiving device serving as the measurement device, with which light intensity is measured, is provided for example on the stage. In addition, the distribution of the intensity over a specific region can also be ascertained.

Detectors receiving in one or two dimensions, quadrant detectors, or a CCD matrix or CCD imager can serve, for example, as receiving devices.

If applicable, the light-sensitive receiving device can additionally have placed in front of it an objective, also mounted on the stage and displaceable with the receiving device, so as thereby specifically to improve the receiving conditions.

In principle, it is conceivable to arrange a measurement device in stationary fashion, thereby making possible continuous monitoring of the illumination situation. In measurement devices in which the illumination beam path must be arranged at the location of an observation specimen, however, this results in an impairment of the area usable for the examination. This also applies to measurement devices that are positioned in the observation beam path. Preferably, therefore, a measurement device is configured in such a way that it can be introduced only temporarily into the illumination beam path or observation beam path of the optical instrument. As a result, while the specimen field is fully utilized, rapid checking of the illumination during operation of the optical instrument is nevertheless ensured, i.e. quasi-continuous monitoring is implemented.

In order to check the illumination, it is also possible, for example, to place at the location of an observation specimen a mirror that deflects the incoming light to a measurement device. A separate measurement device can be provided to sense the light reflected by said mirror.

In a particularly advantageous embodiment, what serves as the measurement device is an image receiver that is in any case a component of the optical instrument and is otherwise intended to sense the image of a specimen that is to be examined. In this case a separate measurement device for evaluating the illuminating light is not necessary. By way of the mirror, for example, the total intensity and its distribution in the specimen field, i.e. in an image field plane, can be sensed.

An additional optical system, e.g. a Bertrand lens, that can be temporarily pivoted into the beam path between the specimen and the image receiver can also be provided in this connection. Introduction of the additional optical system furthermore makes it possible to sense the radiation intensity and its distribution in an aperture plane and take it into consideration in setting the light source and, if applicable, also the pertinent illuminating optical system.

A further possibility for checking the illumination consists in the use of test structures that preferably are of similar configuration to the specimens that are to be examined. These test structures are arranged on the stage, and with it can be temporarily shifted into the specimen field. With the test structures it is possible to determine, in particularly quick and reliable fashion, whether a change in the illuminating light has occurred. Evaluation of the illuminating light influenced by the test structures is preferably performed using the actual image receiver of the optical instrument. The positioning signals for any correction of the position of the light source or the illuminating optical system are then determined on the basis of further, more accurate measurements of the illuminating light.

In a further advantageous embodiment of the arrangement, the control device is linked to a database in which various light parameters for the at least one measurement device are stored in specimen-specific and/or task-specific fashion as reference parameters. The reference parameters are obtained, for example, from measurements on reference specimens. Because the reference parameters for specific illuminated specimens or tasks are stored, they are rapidly available so that the illumination device can be switched back and forth between different states. One example of this is the deliberately oblique illumination of a specimen for special measurement devices, for example a partial-pupil illumination or the like. Switching over between bright-field and dark-field illumination is also conceivable.

In principle, it is possible to integrate the illumination device and the setting device into one unit. In an advantageous embodiment, however, the illumination device and setting device are configured as separate modules that can be releasably coupled to one another. This on the one hand makes possible a particularly compact design for the illumination device, but on the other hand ensures that an alignment of the illumination device can be performed quickly and easily when necessary.

The illumination device preferably comprises at least one coupling member, accessible from outside the illumination device, with which the light source and/or illuminating optical system can be adjusted. The setting device is configured in this context as a setting module which can be attached to the illumination device and removed from it, and which comprises a module housing in which the at least one motorized drive system is arranged, and at least one coupling member that is coupled to the drive system and is accessible from outside the module housing, the coupling member on the module housing being configured to transfer a drive motion to a coupling member of the illumination device, and the pertinent drive system being actuable from outside the module housing. This permits particularly simple realignment or also initial alignment after a replacement of the light source.

A setting module that can be attached to the housing of the illumination device, and must remain on the housing of the illumination device only for the alignment time, is used for this purpose. In this fashion, especially in the case of a realignment, it is not necessary to open the housing of the illumination device. Instead, the interfaces created on the exterior of the housing of the illumination device, in the form of one or more coupling members, serve to perform the alignment from outside.

In addition, the setting module can be used as a particularly compact, easily handled alignment tool for multiple illumination devices having identically arranged and embodied interfaces, i.e. coupling members.

The illumination device preferably encompasses the housing in which the light source and the illuminating optical system are arranged, and adjustment devices that are also arranged in the housing and are coupled to the light source and/or the illuminating optical system in such a way as to adjust each of them in at least one coordinate, a portion of the adjustment device being accessible from outside the housing and being configured as a coupling member for the attachable setting module that, as already stated, in turn has a complementary coupling member for transfer of a drive motion.

In its simplest embodiment, an adjustment of the light source in only one single coordinate is brought about with the setting module, for which purpose it is then sufficient to have in the setting module a single drive device that acts on a coupling member thereof.

Preferably, however, the adjustment device of the illumination device has separate linkage elements, connected to the coupling member, for each adjustable coordinate of the light source and/or of the illuminating optical system. It is thereby possible to adjust each of said coordinates separately and independently, so that exact alignment of the light source and/or of the reflector is easily achieved. Both translational and rotational adjustment motions can be implemented.

For a light source in the form of an incandescent lamp, halogen lamp, discharge lamp, or LED, for example, three translational and optionally also one rotational degree of freedom are provided for adjustment. If an illuminating optical system having a reflector is used, the latter can, for example, also be adjusted in one translational and two rotational degrees of freedom. For a lens, e.g. a collector lens, three translation degrees of adjustment freedom are usually provided. If the light source and the illuminating optical system are constituted by a laser device, an adjustment of the laser head and/or of any lenses that are present can be performed. It is also possible to align the entire laser device as a unit in several degrees of freedom.

It is also conceivable, however, to provide adjustment capabilities for only some of the aforesaid degrees of freedom or coordinates. In one embodiment of the invention, for example, a lamp is adjustable in three coordinate directions and a reflector is adjustable in only one coordinate direction.

A coupling device for interlocking releasable connection to a coupling device, of complementary configuration, of the setting module is preferably provided on an outer wall of the illumination device housing. This permits temporary attachment of the setting module to the illumination device housing, and moreover creates a centering effect so that reliable connection of the respective coupling members is guaranteed.

The coupling device can be implemented very easily on the illumination device side by way of slot-shaped wall openings that can be produced economically. Movable hooks that can interlock with the slot-shaped wall openings can then be provided, for example, on the setting module side. For decoupling, an unlocking apparatus with which the interlocking engagement can be nullified is provided on the setting module.

The capability of coupling the setting module is, in principle, independent of the configuration of the illumination device housing, in particular of whether the latter is configured as an open or closed housing; what is critical is that the respective coupling members can be brought into positive and/or nonpositive engagement. With regard to the contamination problem mentioned earlier, however, it is advantageous if the housing of the illumination device is completely closed.

In an advantageous embodiment of the setting module, a separate drive device is provided for each coupling member. This results in a high level of setting flexibility. For example, a position correction can be performed individually in a plurality of different coordinates.

The number of coupling members on the setting module preferably corresponds to the number of coupling members on the illumination device. This is advantageous for rapid alignment.

Operation of the setting module and of its drive devices is preferably accomplished by way of relative correction variables for the coordinate direction, for example in the form of increments; as a result, the setting module can be utilized universally for a plurality of different types of housing, and is usable without direct sensing of the actual position of the light source or the illuminating optical system.

Preferably a positioning force limiter or torque limiter is furthermore provided for each drive device. This prevents damage to the adjustment device in the housing of the illumination device. For that purpose, the positioning force limiter or torque limiter is matched appropriately to the adjustment device and to a stop provided for the respective coordinate direction.

If, upon attachment of the setting module to the illumination device, each coupling member of the setting module can be coupled positively or nonpositively to a coupling member of the illumination device, good transfer of the drive motion from the drive devices of the setting module to all the elements in the illumination device that are to be adjusted can easily be achieved. As already stated, a temporary attachment of the setting module to the housing of the illumination device can be realized by way of coupling devices, for example in the manner of a bayonet connector.

In a further advantageous embodiment, a controller is provided that is configured to generate control outputs for each of the drive devices. Also present is an operating console having means for command input with which positioning commands for adjustment of the light source and/or the illuminating optical system can be entered manually.

The controller and the setting module can be configured separately as separate devices that can be temporarily coupled to one another via a connecting conductor. This division into separate units allows a compact design for the setting module, which thus can be attached particularly easily to an illumination device even in confined spaces. As a deviation from this, however, it is also possible to integrate the controller and the setting module into a common housing.

In addition, the operating console and controller can also be configured as separate devices that can be temporarily coupled to one another via a data connection. The data connection can be accomplished by way of a conductor, but alternatively also wirelessly. As a result of the separate arrangement of the operating console, the drive devices in the setting module can be remotely controlled. For example, alignment can be performed directly from a location at which the illumination quality is measurable.

As an alternative to this, however, it is also possible to integrate the operating console and controller into a common housing, or even to integrate the operating console into the optical instrument and connect it permanently thereto.

The operating console can, as a component of the optical instrument, simultaneously also be used to control the latter. An operating console of this kind can also be configured as an external unit that can be temporarily coupled to the optical instrument via a data connection, i.e. via a conductor or also wirelessly. An operating console of this kind can moreover be provided in addition to an operating console integrated into the optical instrument, in which context the external unit, if applicable, needs to possess only limited control capabilities.

In addition to the possibility of embodying the setting device as a unit separable from the optical instrument, one or more measurement devices can also be releasably insertable into the optical instrument so that they can be used with different optical instruments. In combination with a setting module of the kind explained above, the result is thus a setting system that is flexibly usable with a variety of optical instruments. The measurement device is introduced temporarily into the beam path of the illuminating optical system, preferably into an aperture diaphragm plane and/or a field diaphragm plane. Also possible is an arrangement in which the one corresponding measurement device is mounted on an eyepiece of the optical instrument.

In a particularly advantageous embodiment of the arrangement according to the present invention, the control device is configured so that, as a function of the variables sensed with the measurement devices, including the light intensity and/or light intensity distribution measured in the aperture diaphragm plane, the light intensity in the aperture diaphragm plane is maximized by adjusting the position of the light source and/or of the illuminating optical system. By selecting the light intensity in the aperture diaphragm plane as a control loop criterion, a high illumination quality is achieved. Optimum alignment is considered to exist, for example, when the intensity value reaches its maximum. In that case the light source, or its hot spot, filament, or the like, is located in centrally symmetrical fashion in the aperture diaphragm.

The subject matter of the invention furthermore encompasses a method for illumination of a specimen field in an optical instrument utilizing an illumination device having a light source and an illuminating optical system, in which parameters of the light produced by the illumination device are measured; the measured parameters are compared to predefined reference parameters; control outputs are generated as a function of the deviation thereby ascertained; and the control outputs are used to actuate motorized, preferably electromechanical drive systems in order automatically to adjust the position of the light source and/or of the illuminating optical system.

In an advantageous embodiment of the method, a measurement of the parameters of the light is performed during operation of the optical instrument, and upon identification of a deviation, operation of the optical instrument is interrupted for the actuation time of the drive systems. This makes it possible principally to monitor the alignment state of the illumination device during operation.

Preferably a two-stage monitoring regime is used, in which upon identification of a deviation, firstly a further measurement device is activated. Only upon confirmation of the deviation by the further measurement device are the positioning commands for the drive systems generated and the drive systems automatically actuated accordingly. This procedure has the advantage that a fast measurement method can be used for the first step, while greater preference is accorded to the confirmation of accuracy. As already stated above, the measurement can be performed continuously during operation of the optical instrument; preferably, however, it is accomplished at periodic intervals.

Test structures are particularly suitable for rapid checking. This involves measuring, during operation of the optical instrument, the light of a test structure that is positioned in the specimen field or will be positioned for that specific purpose in the specimen field. By evaluation of the light of the test structure, a decision is then made as to whether a more accurate measurement and optionally an alignment of the illumination device are necessary.

If a deviation is identified during operation of the optical instrument, the at least one further measurement is then preferably performed in an aperture diaphragm plane and/or intermediate image plane of the optical instrument.

In addition to monitoring of the illumination, with the method according to the present invention it is furthermore possible to adapt the alignment state of the illumination device to an illuminated specimen or an illumination task. In an advantageous embodiment of the method, for this purpose the predefined parameters are sensed during a calibration operation by measuring real illumination conditions for an illumination task and/or for an illuminated specimen in the optical instrument with its measurement devices, and are stored retrievably in a database. The calibration operation can be performed by way of a measurement with test structures, preferably specimen-like test structures.

Also possible is a procedure in which firstly, in a calibration operation, an optimum setting is obtained using reference specimens whose structure is known. A standardization via a test structure is then performed. This is preferably done by first taking measurements, during the calibration operation, with a reference specimen or several reference specimens at various settings of the illumination device. One of those settings is then defined as the optimum setting. The light of a test structure is measured with the optimum setting of the illumination device. The parameters thereby obtained are then stored as characteristic default parameters (reference parameters).

In the context of resetting the illumination device for a new illumination task and/or a specimen, firstly a basic setting of the illumination device can be made using the test structure and the reference parameters stored for the illumination task and/or the specimen. That is followed by a fine adjustment using the parameters stored for the further measurement devices, and optionally by a further monitoring of the setting in the manner explained above.

Monitoring, or an initial alignment or realignment, is preferably accomplished in such a way that the light intensity in the aperture diaphragm plane is controlled to a maximum, for which purpose the measured parameters, including the light intensity and/or light intensity distribution measured in the aperture diaphragm plane, are sensed as input variables, and control outputs are generated for the motorized drive devices in order to adjust the position of the light source and/or of the illuminating optical system.

BRIEF DESCRIPTION OF THE DRAWINGS

The invention will be explained in more detail below with reference to several exemplary embodiments. In the accompanying drawings.

DETAILED DESCRIPTION OF THE INVENTION

Figure 1:
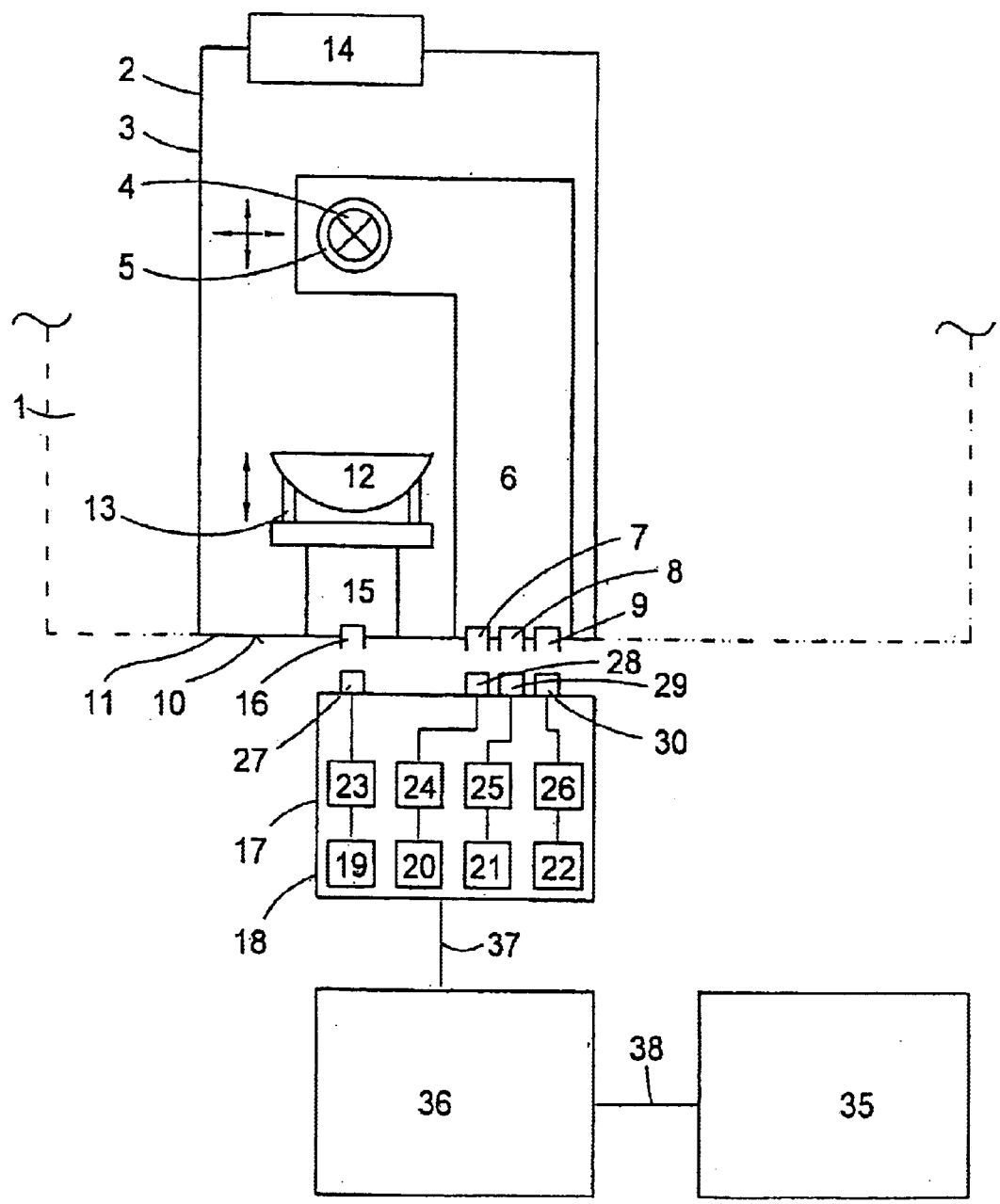
FIG. 1 shows a first exemplary embodiment of an arrangement for illuminating a specimen field in an optical instrument having an illumination device and a modular setting device.
Figure 3:
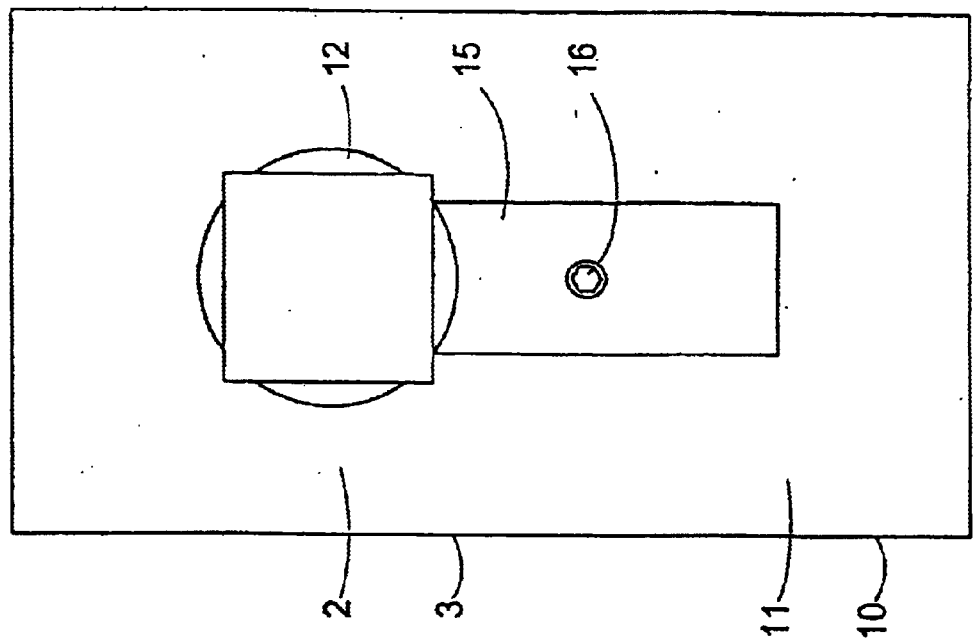
FIG. 3 is a side view of the illumination device and the coupling member for adjustment of the reflector, the lamp and its coupling members for adjustment not being depicted in the drawing.

FIG. 1 schematically depicts an optical instrument 1. Optical instrument 1 is in this case, by way of example, an inspection microscope for the examination of semiconductor wafers.

An illumination device 2 is present on optical instrument 1. This illumination device 2 has an externally closed housing 3, so that the subassemblies arranged within housing 3 are sealed off with respect to optical instrument 1. The risk of contaminating the semiconductor wafers that are to be examined is thereby minimized.

Within housing 3 of illumination device 2, a light source 4—which here is intended to be embodied, by way of example, as a UV arc lamp—is received in a lamp base 5. Power is supplied to the lamp in conventional fashion, so that no further explanation thereof is necessary. Other lamps can, however, also be utilized. In principle, an incandescent lamp, halogen lamp, discharge lamp, or even an LED can be used here.

Figure 2:
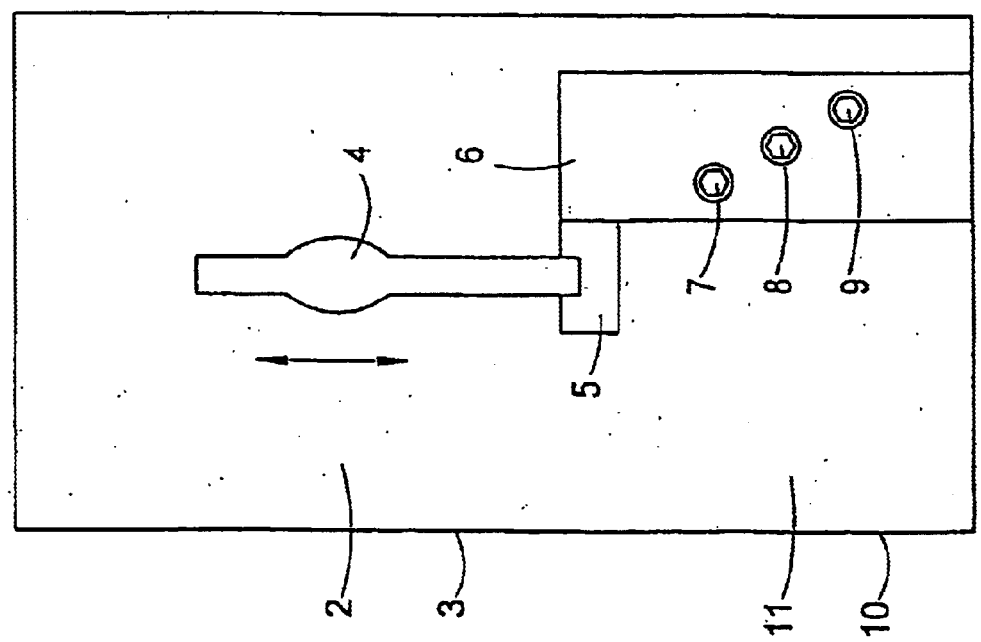
FIG. 2 is a side view of the illumination device having a lamp and a reflector as well as an adjustment mechanism, the coupling members of the adjustment mechanism for displacement of the lamp being shown, but the reflector and its coupling member not being depicted in the drawing.

Lamp base 5 is translationally displaceable in several coordinates with respect to housing 3. The displacement directions are each indicated in FIG. 1 and FIG. 2 with double arrows.

Also arranged in housing 3 of illumination device 2 is an adjustment device. One portion of the adjustment device is coupled to lamp base 5, and enables motion in the coordinate directions. The maximum adjustment travels in this context are limited by stops (not depicted further).

The adjustment device comprises a first linkage 6 for light source 4. First linkage 6 possesses separate linkage elements for each coordinate direction in which lamp base 5 is movable. These linkage elements each encompass at least one coupling member that is accessible from outside housing 3. The externally accessible coupling members 7, 8, 9 serve for connection to a setting module 17 that will be explained in further detail below.

Coupling members 7, 8, and 9 are configured, for example, as shaft ends, having an internally hexagonal profile, whose respective end faces terminate approximately flush with outer wall 10 on back side 11 of housing 3.

Also arranged within housing 3 is an illuminating optical system that in this case comprises at least one reflector 12. Reflector 12 is mounted on tilt alignment elements 13 and is adjustable with respect to a light exit opening 14, as indicated in FIG. 1 by the double arrow next to reflector 12. Located on light exit opening 14 is a mechanical interface to optical instrument 1, as well as a device (not depicted further) for temperature decoupling.

For focusing, reflector 12 is coupled to a second linkage 15, i.e. via further linkage elements of the adjustment device, to a coupling member 16 that is accessible from outside housing 3 and serves for coupling of attachable motorized setting module 17. Coupling member 16 is here once again a shaft end, having an internally hexagonal profile, that terminates flush with outer wall 10 on back side 11 of housing 3.

It is of course also possible to recess coupling members 7, 8, 9, and 16 more deeply below outer wall 10, or alternatively also to allow them to project beyond it. A different positively engaging connection can also be provided instead of an internal hexagon. The adjustment of light source 4 and of the illuminating optical system is preferably accomplished by introducing a rotary motion into coupling members 7, 8, 9, and 16 of illumination device 2. It is also possible, however, to bring about the adjustment motion by way of a purely translational motion or via a spindle motion.

Figure 4:
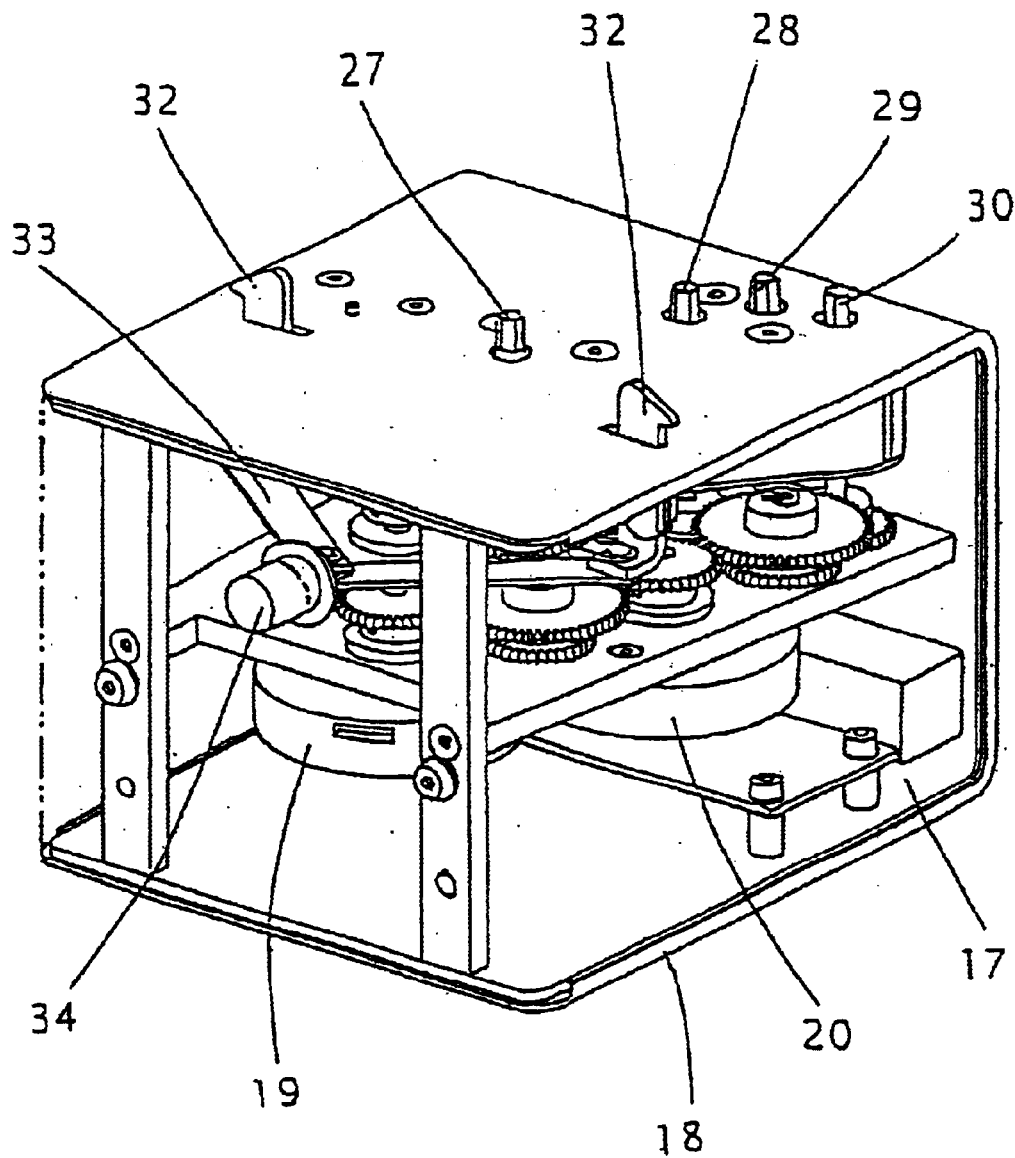
FIG. 4 is a perspective view of the setting module, illustrated here with the module housing partially open.
Figure 5:
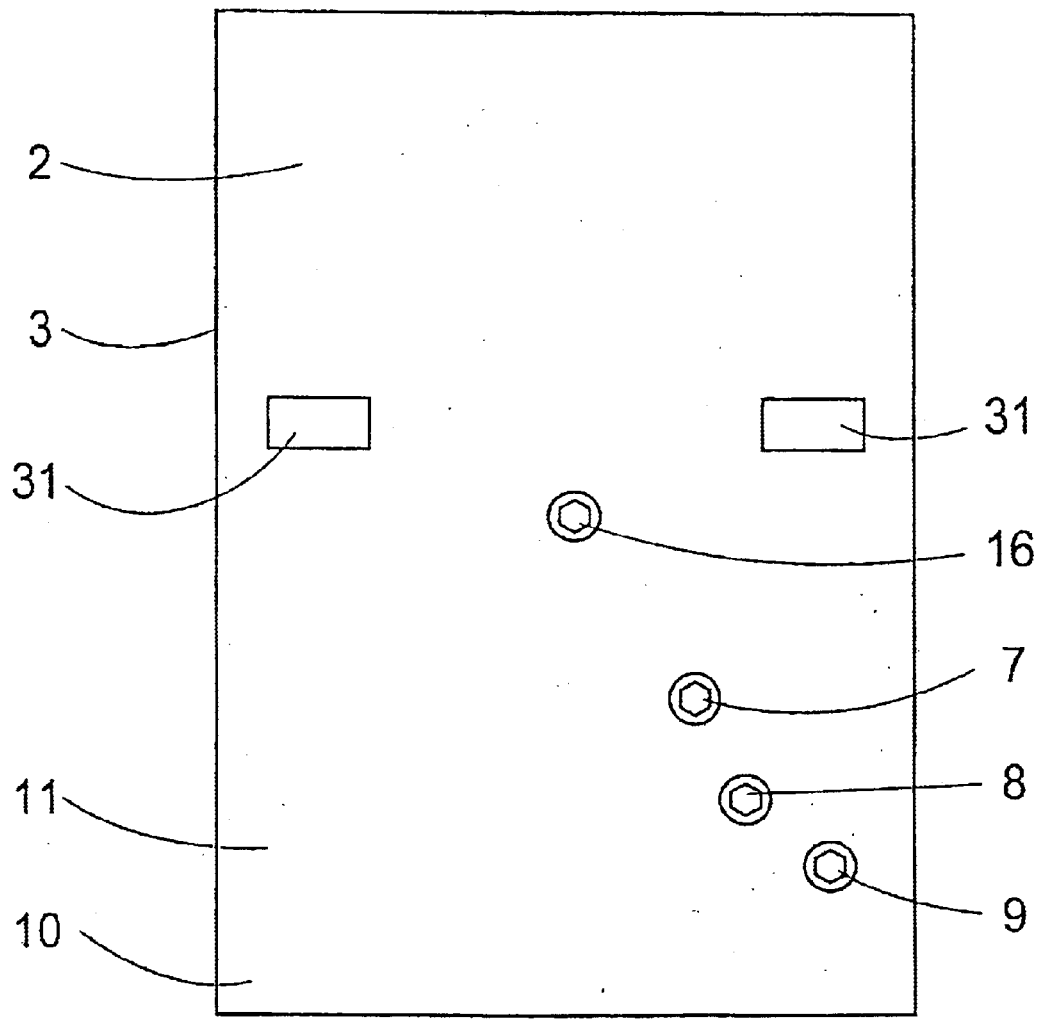
FIG. 5 is a view of the side of the illumination device housing onto which the setting module is attached.

FIG. 1 furthermore schematically shows the aforementioned setting module 17, which is depicted in detail in FIG. 4. Setting module 17 is enclosed by a module housing 18 that can be attached from outside to housing 3 of illumination device 2. Arranged inside module housing 18 in this case are separate drive devices 19 through 22, in the form of stepping motors, for each adjustable coordinate direction of lamp base 5 and reflector 12. These drive devices 19 through 22 are joined via respective individual linkages 23 through 26 to respective coupling members 27 through 30, which are accessible from outside module housing 18.

Individual linkages 23 through 26 are depicted in FIG. 4, by way of example, as gear linkages. Other types of linkages can, however, also be utilized here. Belt drives or flexible shafts, for example, have also proven favorable in this context.

Each coupling member 27 through 30 of setting module 17 is configured, for transfer of a drive motion, in complementary fashion to the respective associated coupling member 7, 8, 9, and 16 of illumination device 2. In the exemplary embodiment, coupling members 27 through 30 on setting module 17 are shaft ends, having an externally hexagonal profile, that project out beyond the outer wall of setting module 17. Upon coupling of setting module 17 to housing 3 of illumination device 2, coupling members 27 through 30 of setting module 17 come into engagement with the corresponding internally hexagonal profiles of coupling members 7, 8, 9, and 16 of illumination device 2. This makes possible a positively engaged transfer of the rotational drive motions of drive devices 19 through 22 and conversion thereof, by means of adjustment linkages 6 and 15 within illumination device 2, into an adjustment motion of lamp base 5 and reflector 12 in the respectively relevant coordinate.

Each of these adjustment motions can be accomplished independently of the adjustment motions in the other coordinates. As a result, the position of light source 4 or lamp base 5, and that of reflector 12, can be aligned without needing to open housing 3 of illumination device 2 for that purpose. To prevent damage to adjustment linkages 6 and 15, suitable torque limiters are provided in setting module 17 for drive devices 19 through 22, respectively.

Also present in illumination device 2 for each coordinate, in addition to the aforementioned stops, are limit switches for the respectively pertinent drive devices 19 through 22 in setting module 17. Return messages from the limit switches are sent to a control device 36 that is explained in further detail below. A cable plug connection is provided on illumination device 2 for signal transfer. A wireless signal transfer is also possible.

Upon coupling of setting module 17 to housing 3 of illumination device 2, the two units are temporarily interlocked with one another. Present for that purpose on the housing sides provided for coupling are suitable coupling devices that make possible a self-retaining connection for a desired period of time, but thereafter can also easily be uncoupled again and thus allow setting module 17 to be removed after completion of the alignment work.

In the exemplary embodiment depicted, a bayonet connector is provided by way of example for this purpose, as indicated in FIG. 4. The bayonet connector is constituted by two hooks 32, movable with respect to one another, that interlock with slot-shaped wall openings 31. Hooks 32 are coupled to an unlocking device 33 with which hooks 32 can be moved toward one another in order to bring them out of engagement with slot-shaped wall openings 31. Unlocking device 33 has for that purpose a button 34, actuation of which triggers this motion. As FIG. 4 shows, hooks 32 and the unlocking device are arranged on setting module 17. Slot-shaped wall openings 31, however, are located on illumination device 2.

Drive devices 19 through 22 are controllable from outside module housing 18 of setting module 17, i.e. correction commands for the position of light source 4 or lamp socket 5 and reflector 12 can be defined from outside and converted into a correction motion or alignment motion. The correction commands are defined by a monitoring person who enters them via an operating console 35 (cf. FIG. 1).

From the correction commands, control outputs for the individual drive devices 19 through 22 are generated in a controller 36. Power to drive devices 19 through 22 can also be supplied via controller 36, which is connected to setting module 17 via a conductor 37 or is integrated directly into setting module 17 or its housing 18. The effects of the correction commands for alignment can be observed by the monitoring person on optical instrument 1, and influenced again for correction if applicable.

In the exemplary embodiment depicted in FIG. 1, both controller 36 and operating console 35 are configured as separate units. Transfer of the correction commands from operating console 35 to controller 36 is accomplished via a data line 38. Instead of this data line 38, however, provision can also be made for a wireless data transfer, for example by means of infrared radiation or ultrasound. The unrestricted mobility of operating console 35 results in a high level of operating convenience, in the manner of a remote control.

As a modification of the exemplary embodiment, operating console 35 can be integrated into optical instrument 1. Optionally, an external operating console 35 can additionally be connected. This is advantageous in particular when controller 36 is arranged in housing 18 of setting module 17.

Alternatively, it is also possible to combine operating console 35 with controller 36 into one unit. A personal computer, for example, can be used for that purpose.

The adjustment possibilities are moreover not limited to the coordinates described here. Instead, further directions for adjustment can be provided, for example, on reflector 12, for which purpose further pairs of coupling members and drive devices must then be provided in appropriate quantities.

With regard to lamp base 5, for example, a rotational degree of freedom, for example about the longitudinal lamp axis, can also be provided. Numerous sub-combinations of adjustment possibilities can also be created from the aforesaid coordinates.

It is furthermore possible to arrange the coupling members for the adjustment of lamp base 5 and the coupling members for the adjustment of reflector 12 in identical fashion, so that it is possible to utilize a setting module 17 whose interfaces are configured for coupling to only one subgroup of coupling members of illumination device 2. For example, firstly only lamp base 5 can be aligned, and after a reattachment of setting module 17 an alignment only of reflector 12 can be performed. This has the advantage that setting module 17 itself remains relatively simple in terms of design even in the context of a large number of setting capabilities.

The invention is furthermore not limited to the alignment of a lamp or a reflector. Instead, lenses or diaphragms can also be correspondingly aligned as adjustable components. In addition, a laser device having a light-generating laser head and a lens arrangement made up of one or more lenses and optionally further diaphragms can serve as the light source and illuminating optical system. In this context, it is possible to arrange the laser head and lens arrangement in individually positionally adjustable fashion. Alternatively, the laser device can also be arranged in the housing of the illumination device as a unit that is adjustable both translationally and rotationally in several coordinates. Laser diodes, gas lasers, and solid-state lasers can be used as light sources in this context.

In conjunction with a pinhole illuminating optical system, for example, a configuration is possible in which the laser head, the lens arrangement, and a pinhole stop can be aligned with setting module 17. The interface between setting module 17 and the aforesaid components can be such that upon attachment of setting module 17, all the adjustments can be performed simultaneously. Also possible, however, is a configuration in which a separate interface is present respectively on the laser head, the lens arrangement, and the pinhole stop for the attachment of setting module 17.

According to the present invention, the arrangement explained above furthermore comprises at least one measurement device (not depicted in FIG. 1), for sensing parameters of the light generated by illumination device 2, whose manner of operation is explained in further detail below with reference to FIGS. 6 through 11.

The measured parameters are processed in controller 36 in order to generate positioning commands for the motorized drive devices of setting module 17. For that purpose, the measured parameters are compared to corresponding predefined parameters. If a deviation is identified upon comparison, control outputs are generated as a function of the deviation that has been identified and are used to actuate the motorized drive devices in order automatically to adjust the position of the light source and of the illuminating optical system. The intensity of the illuminating light serves here, for example, as the control loop criterion. Depending on the lighting task and observation specimen, correspondingly optimized reference parameters are stored for this purpose in a database that is accessed by controller 36.

Figure 6:
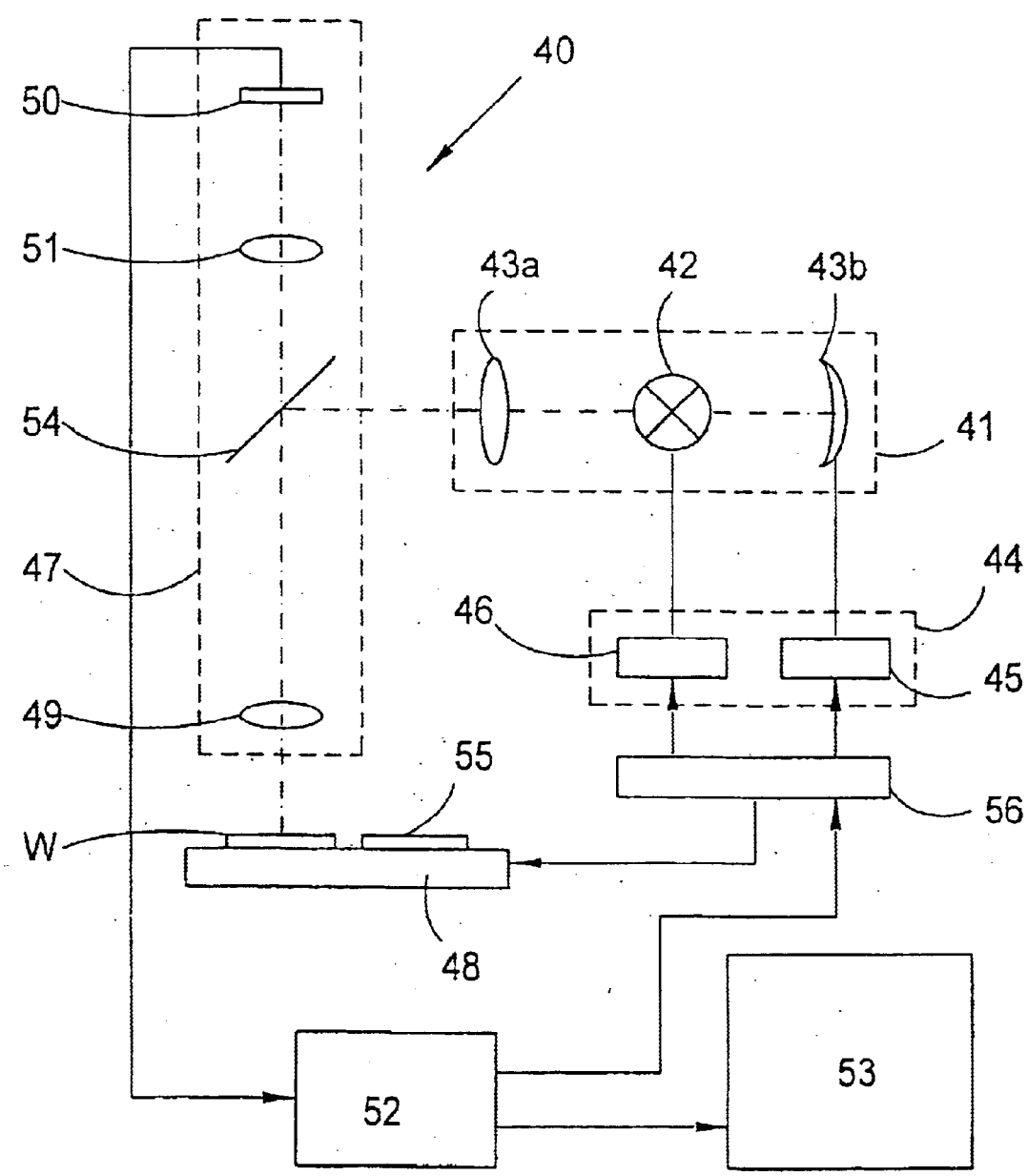
FIG. 6 shows a second exemplary embodiment of an arrangement for illuminating a specimen field in an optical instrument.
Figure 7:
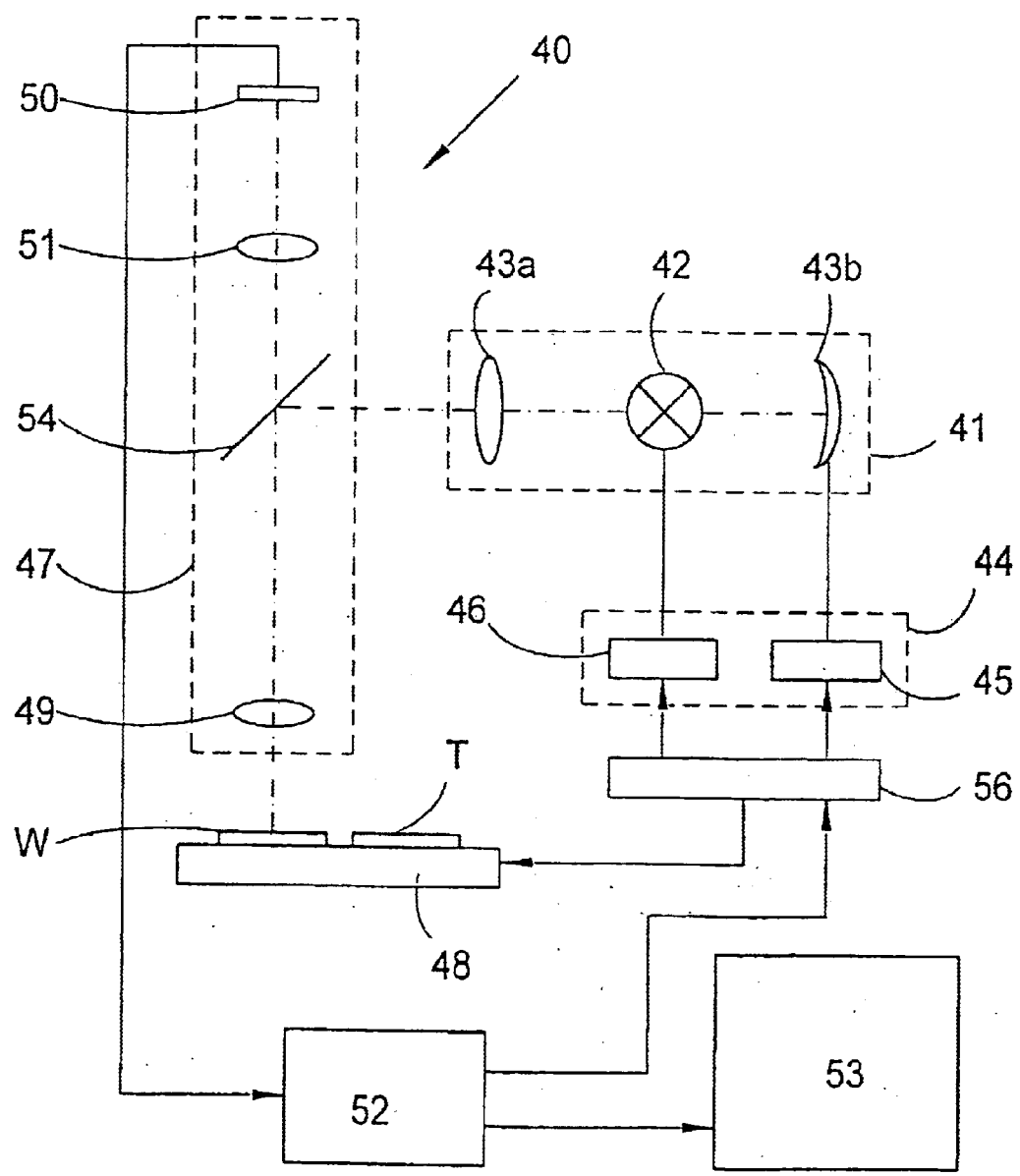
FIG. 7 is a further view of the second exemplary embodiment.

A second exemplary embodiment shows, in FIGS. 6 and 7, the arrangement according to the present invention for illumination of a specimen field in an optical instrument 40. This arrangement once again comprises an illumination device 41 having an adjustable light source 42 and an illuminating optical system 43 comprising a lens arrangement 43a (depicted only schematically here) and a reflector 43b. Also provided is a setting device 44 that has a respective motorized drive system 45 and 46 for each adjustment coordinate of light source 42 and illuminating optical system 43. Illumination device 41 and setting device 44 can be configured as in the first exemplary embodiment.

The light produced by illumination device 41 is directed via an observation section 47 of optical instrument 40 onto a specimen field. This specimen field is located on an adjustable stage 48 of optical instrument 40 that serves to retain a specimen that is to be examined, for example to receive a semiconductor wafer W. By means of a displacement of stage 48 relative to observation section 47, selected portions of the specimen can be individually examined in detail. An objective 49, as well as an image receiver 50 and a tube optical system 51 preceding the latter, are provided for that purpose in observation section 47. Image receiver 50 is in this case, by way of example, a CCD imager with which an image of the portion of a specimen present in the specimen field can be recorded. The corresponding image data are analyzed in a computer 52 and can optionally be displayed on a monitor 53.

Instead of or as a complement to image receiver 50 of tube optical system 51, it is also possible to provide an eyepiece that permits direct viewing of the specimen field.

Figure 12:
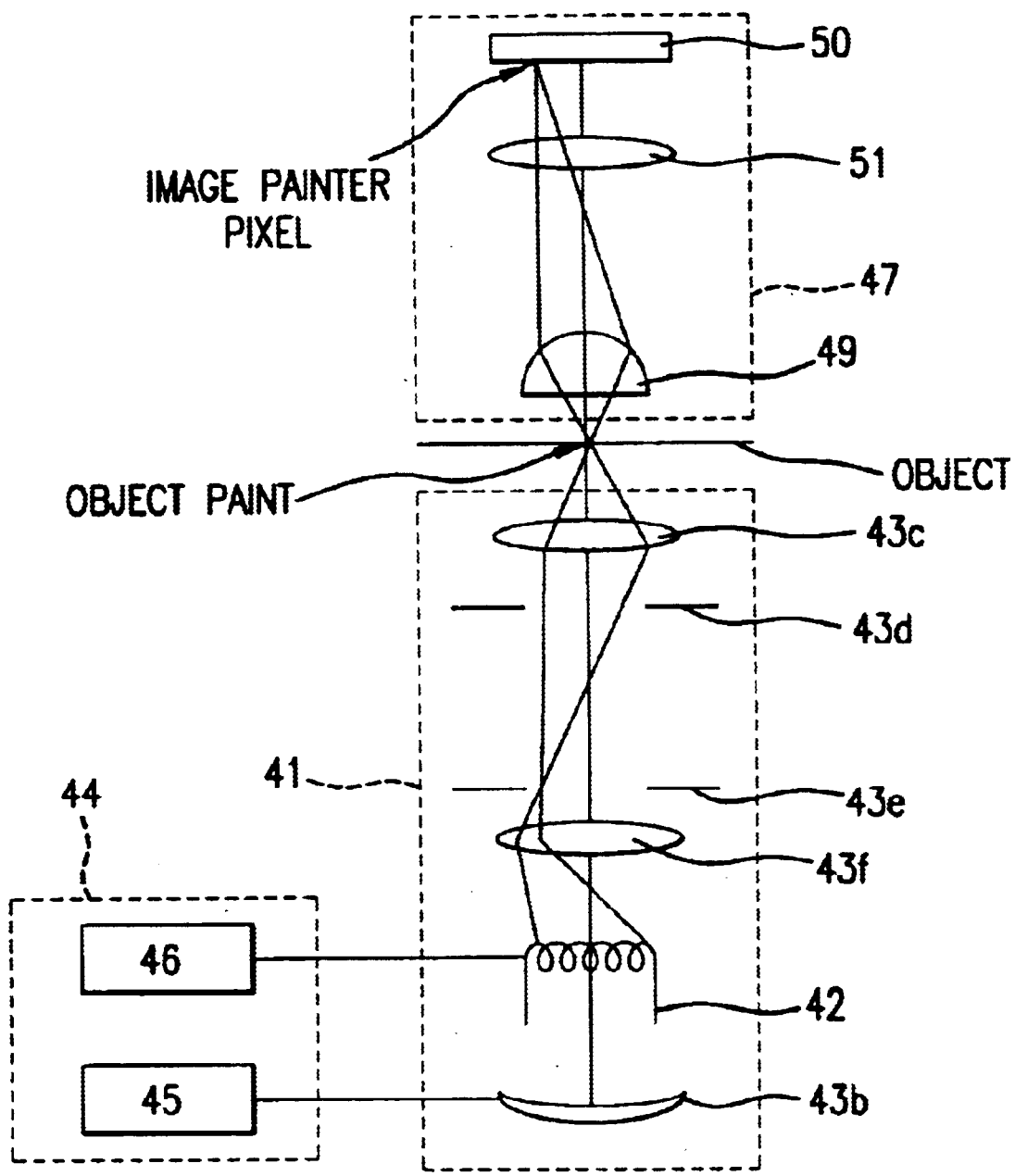
FIG. 12 shows an example of an arrangement of the illumination device in the context of illumination using the transmitted light principle.

In the exemplary embodiment according to FIGS. 6 and 7, the illuminating light is switched into the specimen field via a splitter mirror 54. It is also possible, however, to define for illumination of the specimen field an illumination using the transmitted-light principle, instead of the incident-light principle depicted here. This is shown by way of example in FIG. 12, in which illumination device 41 with setting device 44 is arranged on the side opposite objective 49 with respect to the specimen field. Illumination device 41 illustrated therein shows illuminating optical system 43 in somewhat more detail, specifically with a condenser lens 43c, an aperture diaphragm 43d, a field diaphragm 43e, and a collector lens 43f.

For measurement of the illuminating light in the specimen field, a mirror 55 is arranged on stage 48. Said mirror can, by way of a corresponding motion of stage 48, be introduced temporarily into the specimen field, i.e. into the examination position of a specimen or semiconductor wafer W. The light reflected by mirror 55 is sensed by image receiver 50 and analyzed by means of computer 52. Suitable analytical algorithms can be used to ascertain, for example, the intensity as well as the intensity distribution within the specimen field. By comparison with correspondingly predefined reference parameters, a determination is made as to whether the actual illumination still corresponds to the desired illumination state. If that is no longer the case then, as already explained above, positioning commands for motorized drive devices 45 and 46 are generated in a control device 56 as a function of the measured parameters, until the deviation is controlled out.

It is possible in this fashion to perform an automatic alignment of illumination device 41, in which context, in particular, a positional correction of light source 42 itself is also always possible. The automatic alignment operation can be used both to align a new light source 42 for the first time and to perform a realignment. The automatic alignment can furthermore be incorporated into a continuous or quasi-continuous monitoring regime which guarantees a consistently uniform illumination.

As a complement to mirror 55, a swing-in optical system (Bertrand lens) is additionally provided in the region of tube optical system 51. When the Bertrand lens is swung into the beam path, it is then also possible, with image receiver 50, to measure the total intensity and its distribution in an aperture diaphragm plane and utilize it to assess the illumination or the manner in which the illumination quality is regulated.

For a quick check of the present illumination situation, a test structure T (cf. FIG. 7), which in this case is similar to the specimen that is to be examined, is also provided on stage 48. This test structure T can be moved into the specimen field in the same way as mirror 55. The light reflected from test structure T is then sensed by image receiver 50 and analyzed by means of computer 52 according to predefined criteria. Also present are reference parameters corresponding to said test structure T for desired illumination tasks and/or specific specimens, which parameters were ascertained according to the same criteria for optimum setting of the illumination device.

By comparing the parameters measured on test structure T with the reference parameters, it is easy to determine very quickly whether the actual illumination is still meeting the desired requirements. If that is no longer the case, the further measurements described above are then performed.

Figure 8:
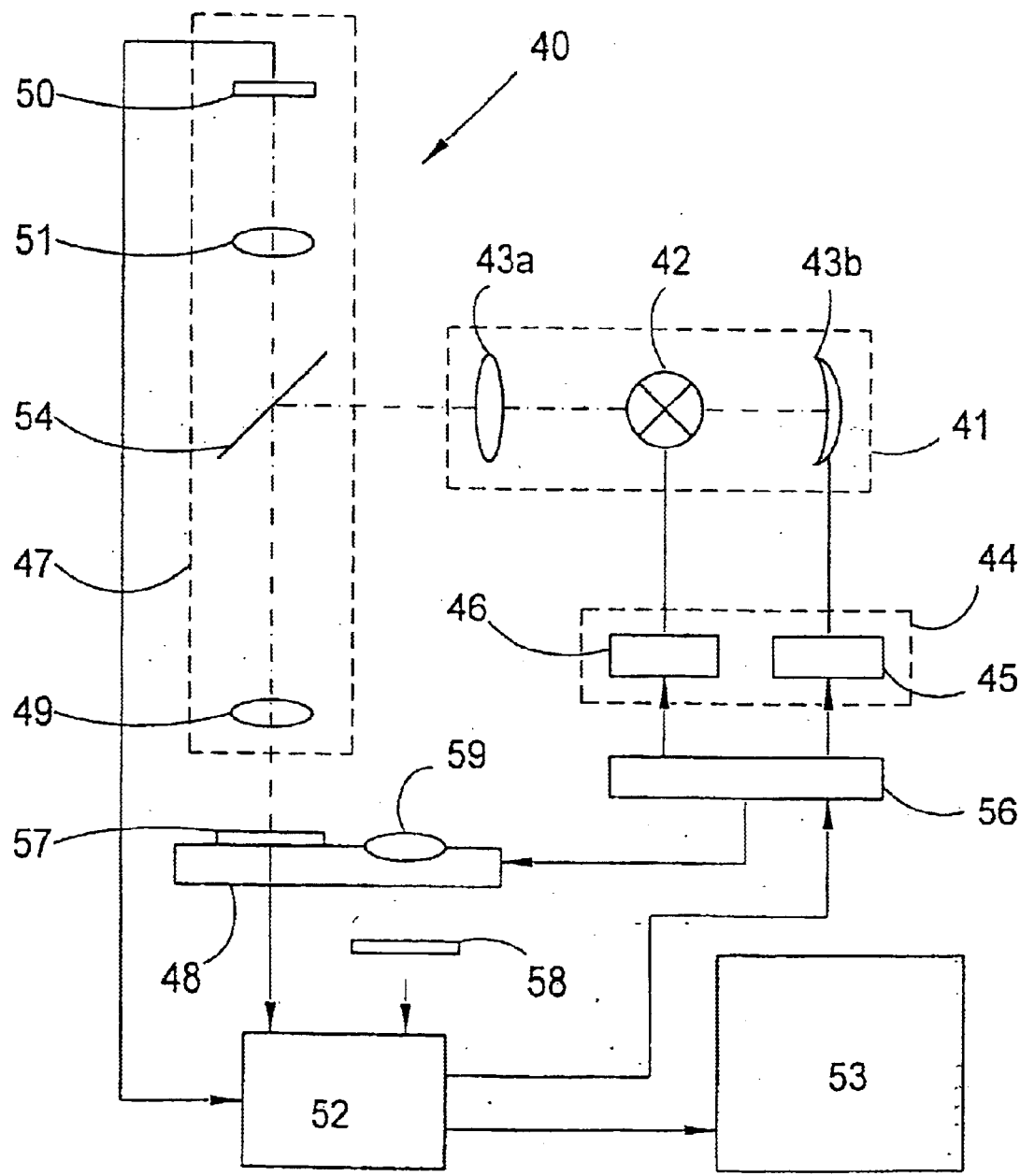
FIG. 8 shows a third exemplary embodiment of an arrangement for illuminating a specimen field in an optical instrument.

FIG. 8 shows a third exemplary embodiment of an arrangement according to the present invention for illumination of a specimen field. The arrangement according to the third exemplary embodiment corresponds substantially to that according to the second embodiment, so that only the differences require discussion at this juncture. Those difference concern the configuration of the measurement devices provided on stage 48. FIG. 8 shows in this instance two different embodiments of the measurement device, i.e. in the first case a light-sensitive receiver 57, placed directly onto stage 48, whose readings are transmitted to computer 52. Light-sensitive receiver 57 is, for example, a one-dimensional detector, a two-dimensional detector, a quadrant detector, a CCD imager, or a CCD matrix.

Alternatively or in addition to the aforesaid receiver 57, a light-sensitive receiver 58 that is configured in the same fashion can be provided. This light-sensitive receiver 58 is additionally preceded, however, by an objective 59 that is also mounted on movable stage 48. With light-sensitive receivers 57 and 58 it is possible in principle to perform an analysis in the same way as with mirror 55, since in each case the illuminating light in the region of the specimen field is sensed directly. Alternating operation with a test structure T present on stage 48 is certainly possible.

Figure 9:
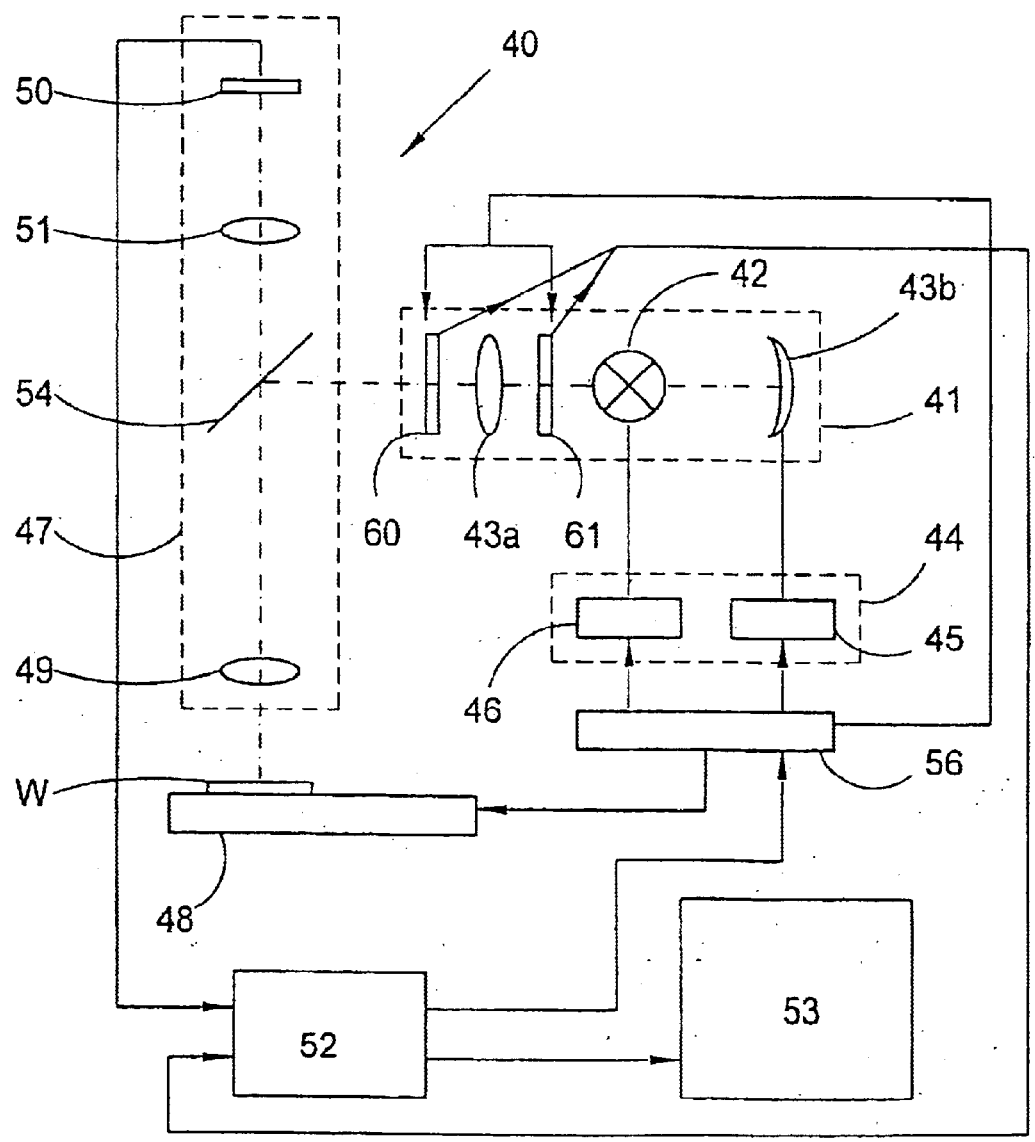
FIG. 9 shows a fourth exemplary embodiment of an arrangement for illuminating a specimen field in an optical instrument.

FIG. 9 shows, with reference to a fourth exemplary embodiment, a further possibility for the arrangement of measurement devices. The fourth exemplary embodiment otherwise corresponds to the second and third exemplary embodiments. As depicted in FIG. 9, measurement devices 60 and 61 are in this case provided in the region of illumination device 41. Each of measurement devices 60 and 61 can be temporarily introduced, for example pivoted, into the beam path of illumination device 41. First measurement device 60 is located in the region of an aperture diaphragm plane, and second measurement device 61 is located in the region of a field diaphragm plane. The respective readings are once again transferred to computer 52. Each of said measurement devices 60 and 61 can also be provided individually. Combinations with measurement devices 55, 57, and 58 already explained above are also conceivable. It is additionally possible to mount a measurement device at least temporarily on an eyepiece of the optical instrument.

The measurement devices explained here by way of example can be provided in stationary fashion. It is also possible, however, to mount them only temporarily at the respective measurement location and to remove them again after the measurement has been performed. The latter is advisable especially when the setting device is also configured as a removable module. The removable measurement devices can then, together with the setting module and the pertinent control device, constitute an alignment system that is flexibly usable and can serve as a retrofit kit for an already-existing arrangement.

The illumination device and the setting device have been described above as separate modules. It is also possible, however, to integrate the illumination device and the setting device into a common unit and to use them for automatic monitoring of the illumination and for automatic adaptation to a specific specimen and/or to an illumination task.

The manner of operation of the arrangement explained above will now be discussed in further detail in conjunction with the use of test structures T.

Figure 10:
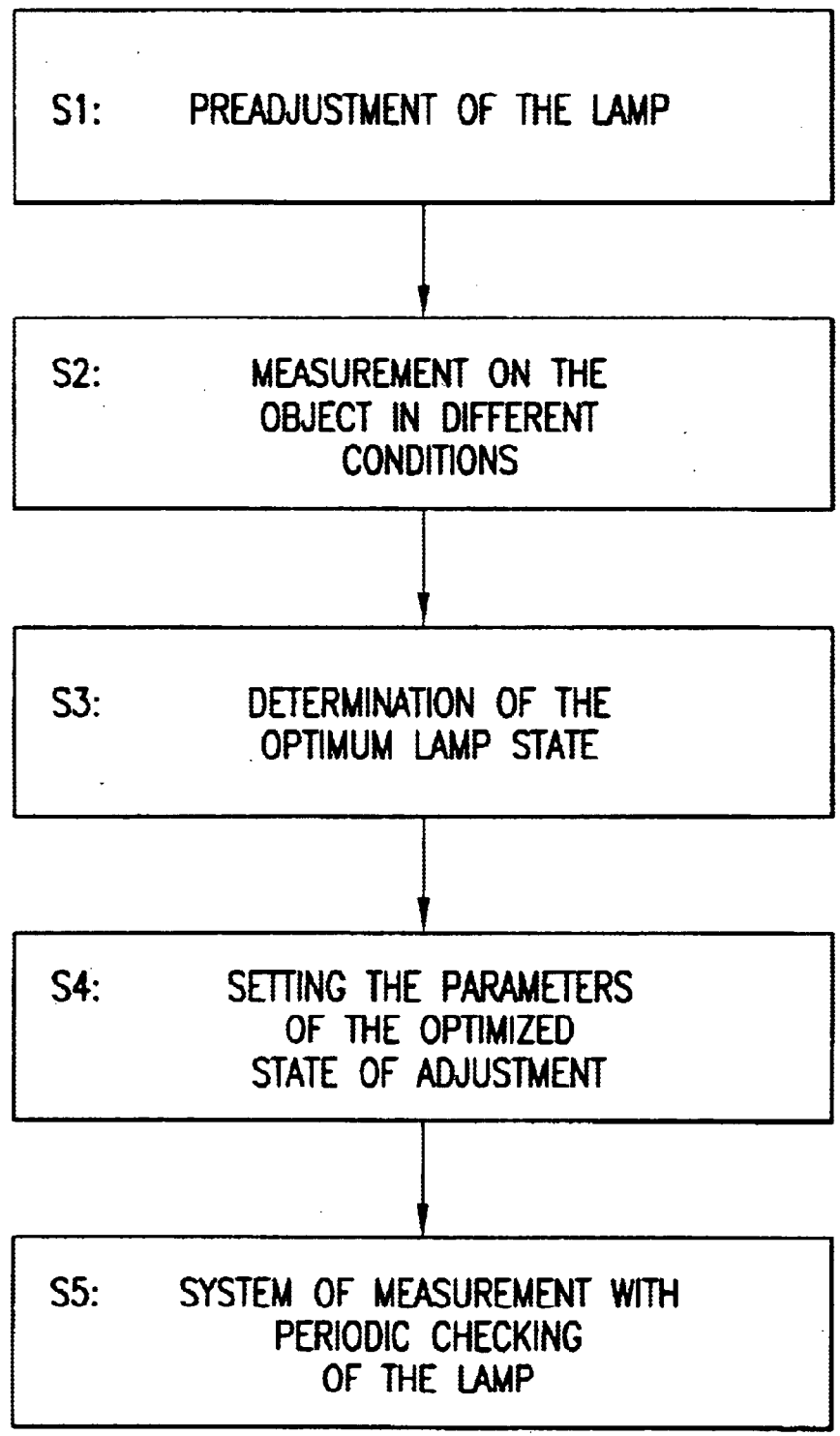
FIG. 10 is a depiction to illustrate the method for adapting the alignment state of the illumination device to a measurement specimen.

FIG. 10 shows for this purpose, by way of example, a method with which the reference parameters for optimum illumination associated with a specific measurement specimen or a measurement task can be generated. After a prealignment of light source 42 (step S1), in a second step S2 measurements are performed on a measurement specimen using different settings of illumination device 41. Adjustment of light source 42 and of illuminating optical system 43 is accomplished via drive devices 45 and 46. These can be manually actuated for that purpose.

The parameters sensed with the measurement devices for the respective measurements are recorded. After that, one of said measurements is defined as the best or optimum measurement (step S3). As a rule, the measurement selected in this context is the one which furnishes the best resolution in the optical instrument. The corresponding alignment of setting device 44 is regarded as the optimum alignment state. In a fourth step S4, the parameters of the measurement devices corresponding to this optimum alignment state are recorded and are stored in a database, so that this time-consuming operation does not need to be performed again for each measurement task and each specific measurement specimen.

After this, the optical instrument is in its optimal state for the measurement specimen or the measurement task, in which actual examination of the specimens or of semiconductor wafer W can be performed.

Upon measurement of the parameters with the individual measurement devices, measurements are also performed with one or more test structures, specifically for that illumination state in which illumination device 41 is in the optimum alignment state. The characteristic parameters obtained from analysis of the light from test structure T are also stored in the database.

Based on the stored parameters it is possible, for example in the event of a failure of light source 42, to reproduce a desired illumination state. It is also possible, by accessing the stored parameters, to implement different illumination states as a function of the measurement task and specimen, i.e. to switch back and forth between different illumination states.

Figure 11:
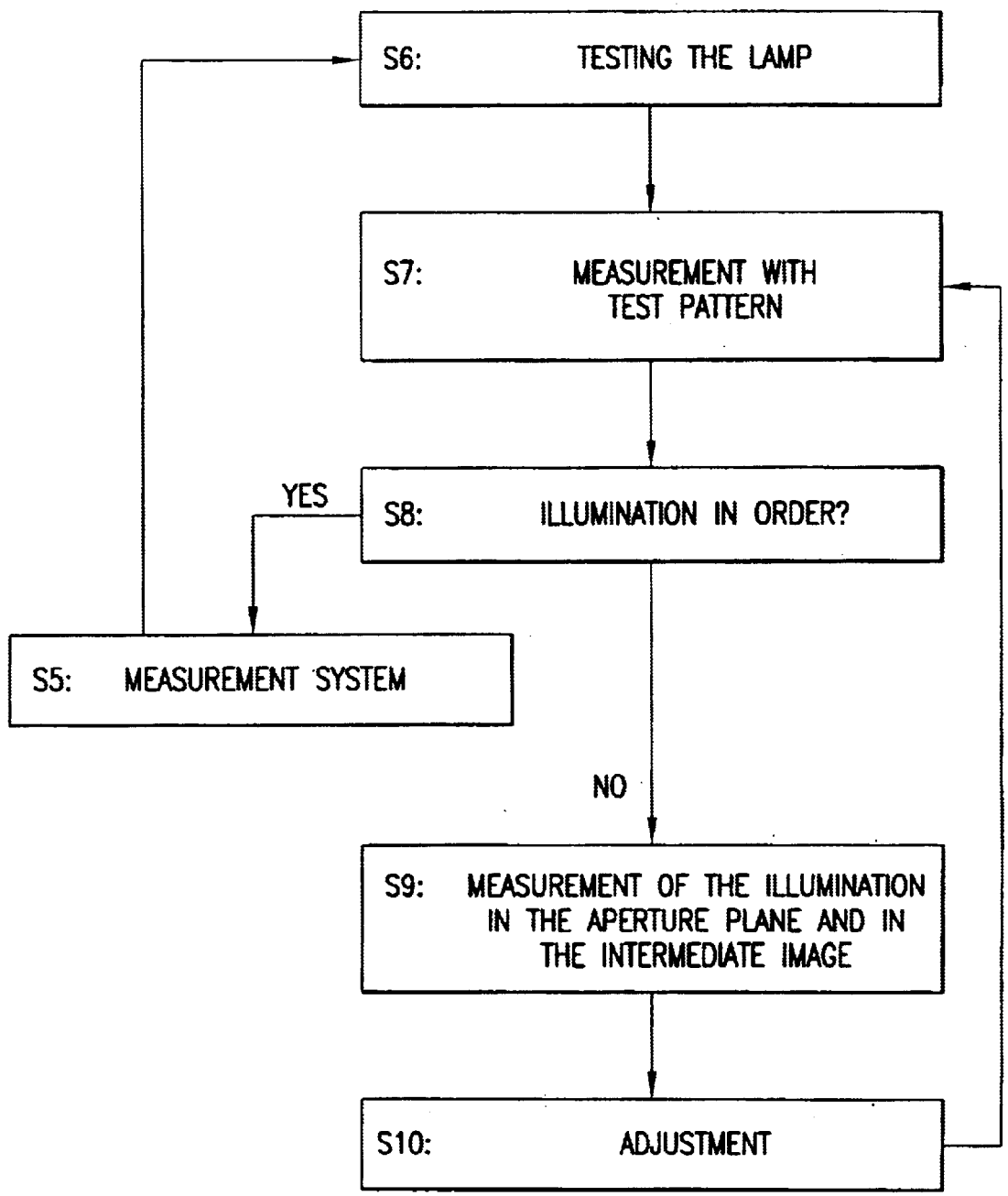
FIG. 11 is a depiction to illustrate the method for monitoring the alignment state of the illumination device.

Operation of the arrangement during the examination of specimens or semiconductor wafers W is depicted in more detail in FIG. 11. Here a check of the illumination is performed at periodic intervals. This can be accomplished, for example, by way of a timing circuit with which a check of the alignment of illumination device 41 is enabled (step S6).

For this purpose, a measurement on a test structure T is performed at regular intervals (step S7). If test structure T is not already present in the specimen field, it is moved into the appropriate position by means of a motion of stage 48. The parameters measured in this context are compared to the characteristic reference parameters (step S8). If a significant deviation is identified, a further measurement with the measurement devices is then enabled (step S9), to check whether a realignment of illumination device 41 is in fact necessary. If not, the control system reverts back to the measurement regime (step S5).

Upon confirmation of the deviation by means of the further measurement devices, operation of the optical instruments is interrupted and a realignment of light source 42 and illumination system 43 via drive devices 45 and 46 is enabled. For that purpose, positioning commands for drive devices 45 and 46 are generated in control device 56, and motorized drive devices 45 and 46 are correspondingly automatically actuated (step S10). This operation is repeated until the measured deviations fall below predefined tolerance thresholds, i.e. until the desired illumination has been established or re-established.

For example, in the case in which the illumination device is reset for an illumination task and/or an illuminated specimen, firstly a basic setting of the illumination device is made using the test structure and the characteristic parameters stored for the illumination task and/or the illuminated specimen. A fine adjustment using the parameters stored for the further measurement devices is then performed.

What serves as the control loop criterion for the automatic alignment is, for example, the measured intensity and/or light intensity distribution in an aperture diaphragm plane. Optimum alignment is achieved when the value of the intensity has reached its maximum. The reason for this is that after the beam has passed through the aperture diaphragm, a maximum intensity is possible only if light source 42 is oriented with central symmetry with respect to the aperture diaphragm.

With the arrangements and method steps described above, reproducible illumination of the specimen field with consistently high quality is achieved. Initial alignment or realignment is accomplished automatically, if necessary. In addition, rapid and flexible adaptation to different illumination tasks and specimens can be effected. The manipulation effort required in this context is extraordinarily low.

PARTS LIST

| | |
|---|---|
| 1 | Device |
| 2 | Illumination device |
| 3 | Housing |
| 4 | Light source |
| 5 | Lamp base |
| 6 | Linkage |
| 7–9 | Coupling members |
| 10 | Outer wall |
| 11 | Back side |
| 12 | Reflector |
| 13 | Tilt alignment elements |
| 14 | Light exit opening |
| 15 | Linkage |
| 16 | Coupling member |
| 17 | Setting module |
| 18 | Module housing |
| 19–22 | Drive devices |
| 23–26 | Individual linkages |
| 27–30 | Coupling members |
| 31 | Wall opening |
| 32 | Hooks |
| 33 | Unlocking device |
| 34 | Button |
| 35 | Operating console |
| 36 | Control device/controller |
| 37 | Conductor |
| 38 | Data line |
| 40 | Optical instrument |
| 41 | Illumination device |
| 42 | Light source |
| 43 | Illuminating optical system |
| 43a | Lens arrangement |
| 43b | Reflector |
| 43c | Condenser lens |
| 43d | Aperture diaphragm |
| 43e | Field diaphragm |
| 43f | Collector lens |
| 44 | Setting device |
| 45 | Motorized drive system/drive device |
| 46 | Motorized drive system/drive device |
| 47 | Observation section/optical instrument |
| 48 | Stage |
| 49 | Objective |
| 50 | Image receiver |
| 51 | Tube optical system |
| 52 | Computer |
| 53 | Monitor |
| 54 | Splitter mirror |
| 55 | Mirror |
| 56 | Control device |
| 57, 58 | Receiver |
| 59 | Objective |

-continued

PARTS LIST

| | |
|---|---|
| 60, 61 | Measurement device |
| W | Semiconductor wafer |
| T | Test structure |

What is claimed is:

1. An arrangement for illuminating a specimen field in an optical instrument for specimen viewing, comprising:
an illumination device arranged, in a housing, comprising a light source and an illuminating optical system, wherein a position of at one of the light source and the illuminating optical system is adjustable within the illumination device;
a setting device comprising at least one drive system and configured to positionally adjust said at least one of the light source and the illuminating optical system;
at least one linkage member connected to said at least one of the light source and the illuminating optical system, wherein the linkage member comprises a coupling member accessible by the setting device from outside the housing;
at least one measurement device configured to sense at least one parameter of the light generated by the illumination device; and
a control device that is configured to generate positioning commands for positional adjustment of said at least one of the light source and the illuminating optical system by the drive system as a function of the sensed parameter.

2. The arrangement as defined in claim 1, wherein the measurement device is mounted on one of a stage that is displaceable in at least one coordinate and a pivot device, so that the measurement device can be placed temporarily into an observation beam path of the optical instrument.

3. The arrangement as defined in claim 2, wherein the measurement device comprises a light-sensitive receiving device.

4. The arrangement as defined in claim 1, further comprising a mirror the configured to deflect light coming from the illumination device to the measurement device and configured to be introduced into an illumination beam path of the optical instrument.

5. The arrangement as defined in claim 1, wherein the measurement device comprises an image receiver of the optical instrument.

6. The arrangement as defined in claim 5, further comprising a Bertrand lens configured to be temporarily introduced into a beam path between the specimen field and the image receiver.

7. The arrangement as defined in claim 1, further comprising a test structure configured to be temporarily introduced into a specimen observation location.

8. The arrangement as defined in claim 1, wherein the control device is linked to a database storing reference parameters for the measurement device, the reference parameters specific to at least one of a measured specimen and a measurement task.

9. The arrangement as defined in claim 1, wherein the illumination device and the setting device are configured as separate modules that can temporarily be releasably coupled to one another.

10. The arrangement as defined in claim 1, wherein the measurement device is configured to be temporarily mounted on an eyepiece of the optical instrument.

11. The arrangement as defined in claim 1, wherein the measurement device is configured to be temporarily introduced into a beam path of the illumination device.

12. A method for illumination of a specimen field, comprising:

providing an optical instrument utilizing an illumination device arranged in a housing, the illumination device comprising a light source and an illuminating optical system, wherein a position of at least one of the light source and the illuminating optical system is adjustable within the illumination device via at least one linkage member connected to said at least one of the light source and the illuminating optical system, wherein the linkage member comprises a coupling member accessible from outside the housing;

measuring at least one parameter of light produced by the illumination device;

comparing the measured parameter to predefined reference parameters to ascertain a deviation;

generating control outputs as a function of the ascertained deviation; and actuating motorized drive systems based on the control outputs to automatically adjust a position of at least one of the light source and the illuminating optical system until the ascertained deviation is compensated for.

13. The method as defined in claim 12, wherein said measurement of the light is performed during operation of the optical instrument, and wherein the method further comprises, upon identification of a deviation, interrupting operation of the optical instrument for an actuation time of the drive systems.

14. The method as defined in claim 12, further comprising, upon identification of a deviation, activating at least one further measurement device to confirm the deviation, wherein the step of generating control outputs is performed only if the deviation is confirmed.

15. The method as defined in claim 12, wherein said measuring is performed at periodic intervals during operation of the optical instrument.

16. The method as defined in claim 12, wherein said measuring comprises, during operation of the optical instrument, measuring light reflected from a test structure that is positioned at a specimen observation location.

17. The method as defined in claim 12, further comprising, upon identification of a deviation during operation of the optical instrument, performing a further measurement in at least one of an aperture diaphragm plane and an intermediate image plane of the optical instrument.

18. The method as defined in claim 12, further comprising:

sensing the reference parameters during a calibration operation by measuring real illumination conditions for at least one of an illumination task and an observation specimen in the optical instrument; and retrievably storing the reference parameters in a database.

19. The method as defined in claim 18, further comprising measuring a specimen-like test structure during the calibration operation.

20. The method as defined in claim 18, further comprising, during the calibration operation, the following steps:

taking measurements with a reference specimen at various settings of the illumination device;

defining one of those settings as the optimum setting;

measuring at least one parameter of light of a test structure with the optimum setting of the illumination device; and storing said at least one parameter as characteristic reference parameters.

21. The method as defined in claim 20, further comprising setting the illumination device for at least one of a new illumination task and a new illuminated specimen, comprising:

basically setting the illumination device using the test structure and the characteristic reference parameters; and finely adjusting the illumination device using the reference parameters.

22. The method as defined in claim 18, wherein said at least one parameter comprises a light intensity in an aperture diaphragm plane, wherein said actuating motorized drive systems based on the control outputs cause the light intensity in the aperture diaphragm plane to be maximized.

23. The arrangement as defined in claim 1, wherein the setting device comprises at least one coupling member, wherein the coupling member of the linkage member is configured to cooperate with a corresponding coupling member of the setting device.

24. The arrangement as defined in claim 1, wherein the coupling member of the linkage member terminates approximately flush with an outer wall of the housing.

* * * * *